United States Patent [19]

Laufhütte

[11] Patent Number: 4,569,832
[45] Date of Patent: Feb. 11, 1986

[54] METHOD AND APPARATUS FOR DESULFURIZING COKE OVEN GASES

[75] Inventor: Dieter Laufhütte, Recklinghausen, Fed. Rep. of Germany

[73] Assignee: Firma Carl Still GmbH & Co. KG, Fed. Rep. of Germany

[21] Appl. No.: 663,861

[22] Filed: Oct. 23, 1984

Related U.S. Application Data

[63] Continuation-in-part of Ser. No. 470,325, Feb. 28, 1983, abandoned.

[30] Foreign Application Priority Data

Mar. 12, 1982 [DE] Fed. Rep. of Germany ....... 3208961

[51] Int. Cl.$^4$ .................... C01B 17/16; B01D 53/34
[52] U.S. Cl. .................... 423/234; 423/238; 423/232; 423/220
[58] Field of Search ................ 423/234, 238, 232, 220

[56] References Cited

U.S. PATENT DOCUMENTS

| | | | |
|---|---|---|---|
| 3,789,105 | 1/1974 | Tippmer et al. | 423/234 |
| 3,819,816 | 6/1974 | Wunderlich et al. | 423/234 |
| 4,009,243 | 2/1977 | Weber et al. | 423/234 |
| 4,302,430 | 11/1981 | Weber et al. | 423/238 |
| 4,342,731 | 8/1982 | Ritter | 423/238 |

Primary Examiner—Andrew H. Metz
Assistant Examiner—B. J. Boggs, Jr.
Attorney, Agent, or Firm—McGlew and Tuttle

[57] ABSTRACT

A method of desulfurizing coke oven gas comprises directing the coke oven gases upwardly and in a hydrogen sulfide scrubber tower, washing the coke oven gases in a cyclic ammonia washing including admixing sulfur compounds containing waste gases and without cooling with ammonia in a degasifying unit which is supplied with ammonia containing water which is advantageously obtained from a tar separator and using the heat content of the waste gases to expel the ammonia from the water, and directing the waste gases laden with the expelled ammonia into the tower. The waste gases advantageously come from a Claus plant process and they are laden with ammonia and they are advantageously directed into the upper portion of the scrubber tower. Ammonia water is circulated in an ammonia circuit from an outlet which is advantageously located in the upper portion of the tower to an inlet which connects to the tower above the outlet. The apparatus includes in addition to the tower in the ammonia water circuit connected into the tower a degasifying unit which is supplied with Claus plant waste gases and into which an ammonia liquor from a tar separator is advantageously circulated. The heat of the waste gases causes a liberation of the ammonia to the waste gases which are then directed to the tower above or substantially at the level at the outlet of the ammonia water circuit.

4 Claims, 2 Drawing Figures

METHOD AND APPARATUS FOR DESULFURIZING COKE OVEN GASES

CROSS REFERENCE TO RELATED APPLICATION

This application is a continuation-in-part of applicant's previous application having Ser. No. 470,325, filed Feb. 28, 1983, and now abandoned.

FIELD AND BACKGROUND OF THE INVENTION

This invention relates in general to the operation of coke ovens and in particular to a new and useful method of desulfurizing coke oven gases wherein sulfur containing waste gases are directed to association with ammoniated water to expel the ammonia therefrom which is carried over with the gases into the hydrogen sulfur scrubber tower to which the coke oven gases are passed.

While carbonizing coal, coke oven gas is obtained containing components which are harmless in later use of the coke gas, but also components which must be removed in a coke oven gas cleaning process. Among the latter components, it is hydrogen sulfide which must be removed from the coke oven gas in hydrogen sulfide scrubbers and then processed to sulfuric acid or elementary sulfur in a so-called Claus plant. During the combustion of hydrogen sulfide with air supply, to elementary sulfur, a waste gas is obtained still containing various sulfuric compounds.

In this method, the waste gas, prior to being introduced into the coke oven gas conduit, may be treated with an aqueous ammoniacal liquor which is obtained from the crude coke oven gas. In accordance with the effect expected while applying this prior art method, it is provided and necessary to cool the waste gas prior to introducing it into the hydrogen sulfide scrubber. This must not affect the hydrogen sulfide scrubbing process, i.e. a high degree of hydrogen sulfide absorption must be maintained. This prior art method does not provide any improvement in the degree of desulfurization, nor is such an improvement sought or achieved.

What is sought is only a utilization of the waste gases leaving the Claus patent so as to make them harmless either completely, or to a high degree. It is further disadvantageous in this prior art method that the waste gases leave the Claus plant with temperatures of 120° to 150° C. and must then be cooled at adequate costs. Their considerable heat content is transmitted to the cooling water without any utilization. This is technologically unsatisfactory and uneconomical.

German Pat. AS No. 22 57 023 discloses the removal of sulfur compounds still present in the waste gas from a Claus plant. In this reference the waste gas is mixed together in a conduit upstream of a tar separator and/or a benzene scrubber and/or a hydrogen sulfide scrubber. This reference discloses the type of prior art process discussed above.

U.S. Pat. No. 3,789,105 to Tippmer et al discloses a hydrogen sulfide stripping method for coke oven gases and provides two different washing liquor circuits. The use of gases containing sulfur compounds, and in particular the waste gases of a Claus process, are not taught however nor is it taught to supply such gases along with coke oven gases into a scrubber. U.S. Pat. No. 4,302,430 to Weber et al discloses the use of hot waste gases containing sulfur compounds for stripping ammonia from ammonia liquors and supplying the cooled waste gases loaded with ammonia to a scrubber into which a crude coke oven gas is also supplied. This reference however does not teach that waste gases from a Claus plant can be used as the sulfur containing compounds.

SUMMARY OF THE INVENTION

The invention is directed to an improved method of desulfurization of coke oven gas, resulting in a higher degree of desulfurization and at the same time finally utilizing the waste gas from a Claus plant.

In accordance with the method of the invention, coke oven gases are desulfurized by directing them upwardly in a hydrogen sulfide scrubber tower for washing the coke oven gases in a cyclical ammonia washing. The sulfur compound containing waste gases such as Claus plant waste gases without cooling are directed into a degasifying unit along with ammonia liquid, for example obtained from a tar separator, with the heat of the waste gases used to expel the ammonia from the water and which expelled ammonia is directed with the waste gases into the scrubber tower.

Surprisingly, the inventive method results in a well defined increase in the degree of desulfurization since the waste gases from the Claus plant laden with ammonia and separately supplied to the hydrogen sulfide scrubber facilitate and even support the scrubbing out of hydrogen sulfide. Further, experience has shown that the prior art introduction of the waste gases from the Claus plant upstream of the hydrogen sulfide scrubber produces no effect on the degree of desulfurization, since this only changes the composition of the supplied crude coke oven gas and does not change the properties of the supplied coke oven gas. In the inventive method, on the contrary, the waste gas enriched or laden with ammonia is supplied intentionally directly into the hydrogen sulfide scrubber. There are known coke oven gas desulfurization methods based on cyclic ammonia scrubbing, where in addition to introducing circulated ammonia liquor into the hydrogen sulfide scrubber at spaced-apart locations, gaseous ammonia in the form of vapors is fed to the upper part of the hydrogen sulfide scrubber, however, these are normal stripper vapors, not waste gas from a Claus plant. The stripper vapors used in the prior art method are obtained while stripping ammonia from coke oven condensates with stream (German Pat. No. 14 94815). In contradistinction thereto, in the inventive method, waste gases from a Claus plant, and enriched with ammonia, are used, so that the degree of desulfurization is increased, while disposing of the undesirable waste gases of the Claus plant at the same time.

Particularly effective with regard to the desulfurization of the coke oven gas is an introduction of the ammonia laden waste gases into the upper part of the hydrogen sulfide scrubber. Preferably, in this case, the waste gas is supplied at a location above the inlet for introducing the separated ammonia liquor into the hydrogen sulfide scrubber. This makes it possible to increase the degree of desulfurization in a controlled and well defined manner. In this connection, it is advantageous to heat the waste gas from the Claus plant, prior to introducing it into the degasifying unit, and/or make the ammoniacal liquor homogeneous by mixing, in order to obtain a uniform degree of desulfurization.

The distinctive feature of the inventive method is that the heat content of the waste gas is advantageously used for simultaneously enriching the waste gas with ammonia, so that the waste gas can then be employed for improving, or increasing the degree of, the desulfurization in the hydrogen sulfide scrubber. This at the same time makes unnecessary a special cooling of the waste gas, so that after passing through the degasifying unit, the waste gas can immediately be supplied, without any preliminary treatment, into the hydrogen sulfide scrubber. The ammonia expelled from the aqueous liquor and absorbed by the waste gas increases the ammonia concentration in the hydrogen sulfide scrubber, to the effect that the balance between ammonia and hydrogen sulfide is displaced toward the bonding side, i.e. the washing out of hydrogen sulfide from the coke oven gas is supported.

Also washed out in this process are the hydrogen sulfide compounds still present in the waste gases, and sulfur dioxide too. A small portion of the ammoniacal hydrogen sulfide liquor is removed from this process in a manner known per se, and processed in strippers with or without the addition of alkalis or alkaline earths. Admixing of the mostly inert waste gases, which are composed substantially of nitrogen, carbon dioxide, and water vapor, to the coke oven gas produces a favorable effect on the calorific value to be adjusted.

Accordingly, it is an object of the invention to provide an improved method of desulfurizing coke gases wherein waste gases are first circulated in a degasifying plant to extract ammonia from ammoniated liquor which is also circulated through the gases and the waste gases which are expelled from the liquid are directed into the hydrogen sulfur scrubber tower.

A further object of the invention is to provide a device for carrying out the desulfurization of coke oven gases which is simple in design, rugged in construction and economical to manufacture.

The various features of novelty which characterize the invention are pointed out with particularity in the claims annexed to and forming a part of this disclosure. For a better understanding of this invention, its operating advantages and specific objects attained by its uses, reference is made to the accompanying drawing and descriptive matter in which a preferred embodiment is illustrated.

DESCRIPTION OF THE PREFERRED EMBODIMENT

Figure 1:
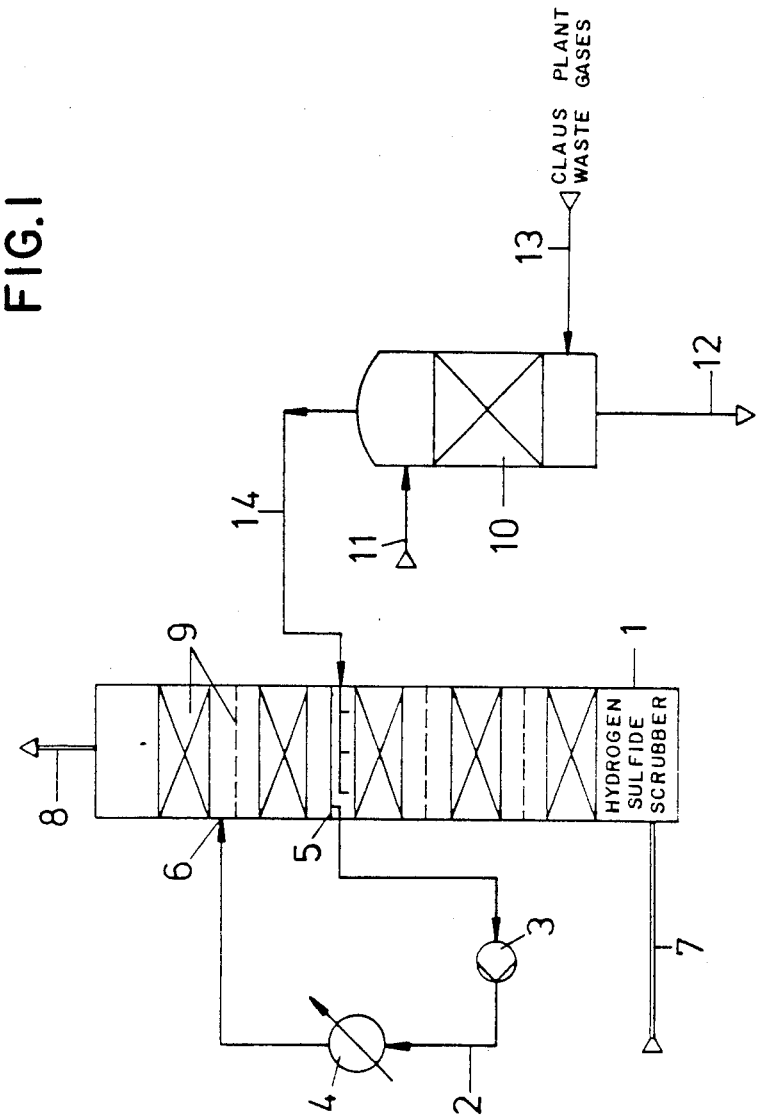
FIG. 1 is a schematic representation of a plant for effecting the desulfurizing of coke oven gases using a degasifying unit with a hydrogen sulfide scrubber.

Referring to FIG. 1 in particular the invention therein comprises an apparatus for desulfurizing coke oven gas which comprises a hydrogen sulfide scrubber tower 1 into which coke oven gases are directed through a connecting line 7 so that they move upwardly in the tower while the gases are washed in a cyclic ammonia washing. In a desulfurizer located alongside the tower 1, sulfur compounds containing waste gases such as those obtained from a Claus plant and without cooling are directed through an inlet line 13 into the degasifying unit 10. The gases are directed into association with ammonia containing liquid, for example from a tar separator which is directed into the degasifier through a line 11. The heat of the waste gases is used to expel ammonia from the liquid and the gases are carried over with the expelled ammonia through a connecting line 14 which connects into the tower 1.

The hydrogen sulfide scrubber is designed as a scrubber tower 1 and the tower is connected to an ammonia circuit 2. Through this ammonia circuit 2, by means of a pump 3, ammonia is circulated from outlet 5 of hydrogen sulfide scrubber 1 through a cooler 4 and back to the scrubber through inlet 6. The coke oven gas is supplied through line 7 into the lower part of hydrogen sulfide scrubber 1 and is discharged therefrom through line 8 at the top of scrubber 1. The internal structures of scrubber 1 vertically distributed over the height thereof are indicated at 9.

Associated with scrubber 1 is the degasifying unit 10 into which ammoniacal liquor is supplied through line 11 to be discharged through line 12. This ammoniacal liquor comes either from the tar separator or from a primary or secondary cooler, or from the ammonia scrubber, or from all these parts of equipment. The waste gas from the Claus plant and carrying hydrogen sulfide, sulfur dioxide, and other sulfur compounds as mentioned above, is directed into degasifying unit 10 countercurrently and thereby cooled and enriched with ammonia. The waste gas is supplied through a line 13 to the bottom of the unit. The gas laden with ammonia is then discharged through a connecting pipe 14 into hydrogen sulfide scrubber 1. In the shown example, the ammonia laden waste gas is supplied about in the zone of outlet 5 of ammonia circuit 2. As explained above, however, it is particularly advantageous to introduce the ammonia laden waste gas into the hydrogen sulfide scrubber above the inlet 6 of ammonia circuit 2 as shown by the dotted portion of line 14.

Figure 2:
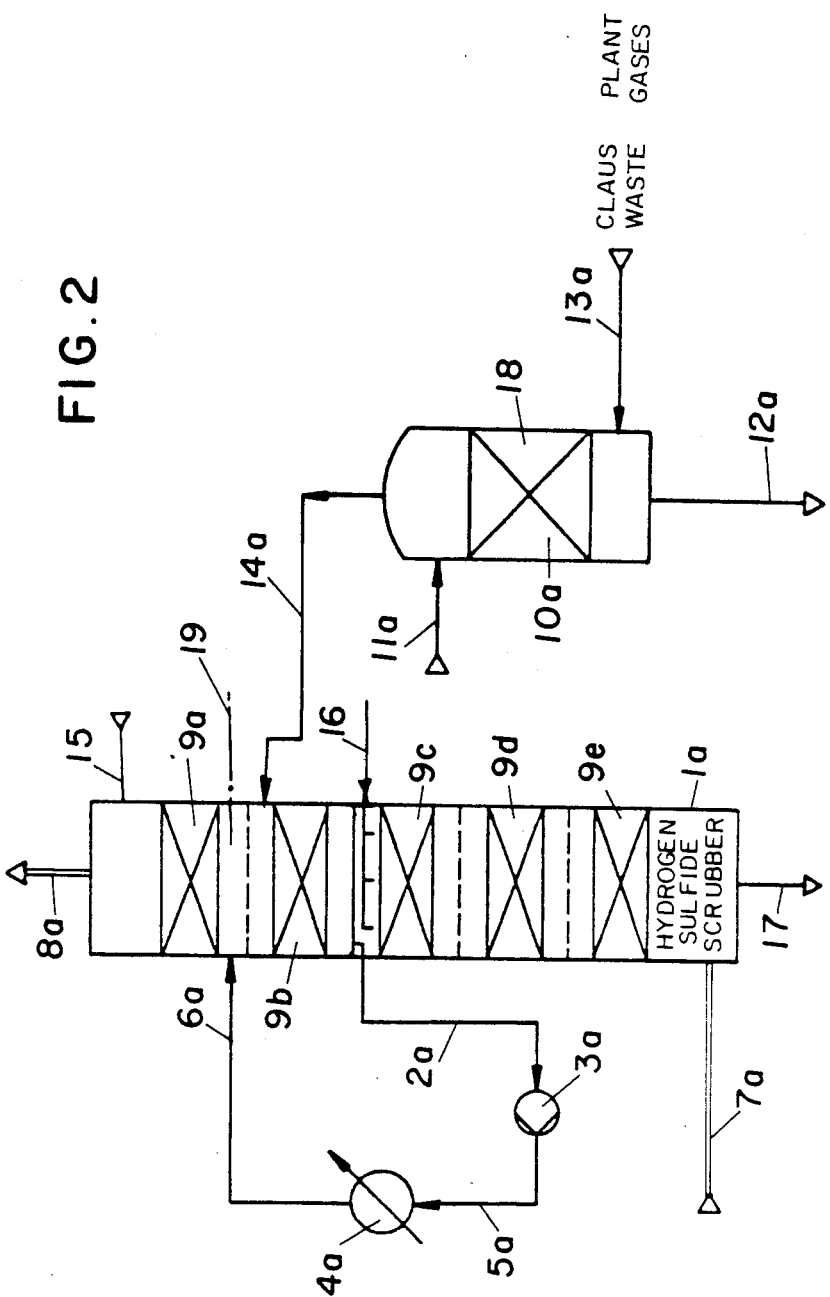
FIG. 2 is a view similar to FIG. 1 showing a more specific embodiment of the invention.

FIG. 2 shows a more specific embodiment of the invention which illustrates the example set forth hereinunder. In FIG. 2 the gaseous phase of the scrubber also contains carbon dioxide and hydrogen cyanide, in addition to ammonia and hydrogen sulfide.

EXAMPLE

In a plant according to FIG. 2, 65,000 $Nm^3$ (standard cubic meters) per hour of crude coke oven gas having a temperature of 25° C. and containing 9 grams per $Nm^3$ of $H_2S$ and 5 grams per $Nm^3$ of $NH_3$ are to be stripped of $NH_3$ and $H_2S$ to a maximum possible extent. To this end, a crude coke oven gas is supplied through a line 7a into a tower-type scrubber 1a having built-in sections 9a to 9e and a total height of 28 meters, with a diameter of 3 meters at the bottom. The built-in sections comprise about 2.5 meter high beds of filler material or packing, and intermediate bottoms therebetween. Through a line 15, 25 cubic meters per hour of fresh water are introduced into scrubber 1a. In addition, at a level of 16 meters (from the bottom of the scrubber) and through a line 16, 57 cubic meters per hour of deacidized ammoniacal liquor having a temperature of 25° C. and a content of 23 grams per liter of $NH_3$ and 3 grams per liter of $H_2S$ are supplied to the scrubber beneath the intermediate bottom of section 9b. This deacidized ammoniacal liquor is supplied from a deacidizer into which the ammonia containing, and $H_2S$ loaded washing liquor obtained from scrubber 1a (line 17) is processed. The scrubber refills with fresh water and deacidized ammoniacal liquor. Above the intermediate bottom of section 9b, 250 cubic meters per hour of washing liquid are withdrawn through a line 2a and recycled through a pump 3a, a line 5a, a cooler 4a and line 6a to a level of 23 meters of the scrubber, above the intermediate bottom of section 9a. In this circuit, the washing liquid is cooled in cooler 4a from 25° C. to 23° C. While passing through the liquid which is finely dispersed in the packing beds, the gas is freed from most of the $H_2S$ and escapes through the line 8a while having an $H_2S$ content of 0.25 grams per $Nm^3$ and an $NH_3$ content of 0.02 grams per $Nm^3$. Over the entire height of the scrubber, the gas pressure is about 1.3 to 1.0 bar, and the gas temperature remains substantially unchanged at 25° C. Following this scrubbing, the gas is supplied for its predetermined use.

Through line 17, 82 $m^3$ per hour of washings having a temperature of 25° C. and a content of 22 grams per liter of $NH_3$ and 9.1 grams per liter of $H_2S$ are drained from the $H_2S$ scrubber and processed in a plant (not shown) comprising a $NH_3$ stripper and a deacidizer which are known. In this process, ammoniacal liquor is obtained which is supplied through line 16 to the $H_2S$ scrubber 1a. The liquor has a temperature of 25° C. and a content of 23 grams per liter of $NH_3$ and 3 grams per liter of $H_2S$, as already indicated above. At 10a, a tower type degasifier is shown, having a height of 7 meters and a diameter of 1.6 meters, and containing a 4 meters high bed 18 of filler material. The degasifier is fed at its top through line 11a with 50 cubic meters per hour of ammoniacal liquor having a temperature of 80° C. and coming from a tar separator of a coke oven gas processing equipment and from the coke oven gas precooler and the ammonia scrubber. This liquor contains 4 grams per liter of $NH_3$ and 0.5 grams per liter of $H_2S$. From a Claus plant, 3,500 cubic meters per hour of waste gas having a temperature of 100° C. and a pressure of 1.3 bar are supplied through a line 13a to the degasifier at the sump thereof. The Claus plant supplying this gas is a plant in which the $H_2S$ stripped in the deacidizer is processed to sulfur. This gas contains only traces of $H_2S$ and $SO_2$. Through a line 12a, 50 cubic meters per hour of water having a temperature of 90° C. and a content of 0.5 grams per liter of $NH_3$ and 0.3 grams per liter of $H_2S$ are drained and supplied to the waste water processing plant. At the top of degasifier 10a, 3500 $Nm^3$ per hour of gas having a temperature of 65° C. and a content of 50 grams per $Nm^3$ of $NH_3$ and 2.8 grams per $Nm^3$ of $H_2S$ are discharged. This gas is introduced through a line 14a into scrubber 1a at a level of 21.5 meters from the scrubber bottom, above section 9b, and below the intermediate bottom of section 9a.

While scrubbing out $H_2S$ from gases with an aqueous ammonia solution, it is important to have as much as possible of the ammonia in the liquid phase, since this favors the scrubbing and shifts the equilibrium for binding $H_2S$ to $NH_3$. Now, to force the gaseous ammonia into solution, an internal washing liquid circuit is provided at the scrubber. For this purpose, washing liquid is drawn off scrubber 1a above the intermediate bottom of section 9b, through line 2a, in an amount of about 250 cubic meters per hour, and recycled by pump 3a through line 5a and cooler 4a where the liquid is cooled from 25° C. to 23° C., and line 6a to the $H_2S$ scrubber above the intermediate bottom of section 9a. In this way, at the level 19, an ammonia content of 3 grams per $Nm^3$ is obtained in the gas flowing up. Under otherwise identical conditions, if the scrubber would be operated without this internal circuit, an ammonia content of 5 grams per $Nm^3$ would be obtained at the level 19 in the upstreaming gas to be scrubbed, and the $H_2S$ content of the cleaned coke oven gas discharged through line 8 would rise to 0.05 grams per $Nm_3$.

While a specific embodiment of the invention has been shown and described in detail to illustrate the application of the principles of the invention, it will be understood that the invention may be embodied otherwise without departing from such principles.

What is claimed is:

1. Method of desulfurizing coke oven gases, comprising directing the coke oven gases upwardly in a hydrogen sulfide scrubber tower having a lower portion, a middle portion and an upper portion, while washing the coke oven gases in a cyclic ammonia washing, wherein an ammonia cooling circuit is connected to the upper portion of the tower for circulating ammonia water into the tower, including a circuit outlet connected to the upper portion of the tower and a circuit inlet connected from the circuit outlet back to the upper portion of the tower at a level above the circuit outlet, independently separately admixing sulphur compounds containing hot waste gases from a Claus process used to produce sulfuric acid or elemental sulfur, and which hot waste gases have not been cooled, with ammonia in a degasifying unit which is supplied with ammonia containing water, using the heat content of the hot waste gases to expel the ammonia from the water, and directing the waste gases laden with the expelled ammonia from the degasifying unit into the upper portion of the tower at a level above the circuit inlet and into association with the coke oven gases for increasing the ammonia concentration in the tower and correspondingly increasing the degree of desulfurization of the coke oven gases in a controlled manner.

2. Method of claim 1 wherein the waste gases are heated prior to introduction thereof into the degasifying unit.

3. Method of claim 1 wherein the ammonia containing water is homogeneously mixed with the waste gases in the degasifying unit.

4. Device for desulfurizing coke oven gases, comprising a hydrogen sulfide scrubber tower having a lower portion, a middle portion and an upper portion, an ammonia water cooling circuit connected into the tower for circulating ammonia containing water into the upper portion of the tower, including a circuit outlet connected to the upper portion of the tower and a circuit inlet connected from the circuit outlet back to the upper portion of the tower at a level above the circuit outlet, a degasifying unit alongside the tower and having a unit inlet for sulfur compounds containing hot waste gases from a Claus process which are circulated through the degasifying unit and a unit outlet for the hot waste gases laden with ammonia which is connected to the upper portion of the tower at a level above the ammonia water cooling circuit inlet, and means for circulating an ammoniated liquor to the degasifying unit to permit the hot waste gases to expel the ammonia therefrom for passage therewith in gaseous form from the unit outlet to the upper portion of the tower.

* * * * *